(12) United States Patent
Hahn

(10) Patent No.: US 9,168,624 B2
(45) Date of Patent: Oct. 27, 2015

(54) DUST EXTRACTOR

(75) Inventor: Norbert Hahn, Hunstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 366 days.

(21) Appl. No.: 13/344,101

(22) Filed: Jan. 5, 2012

(65) Prior Publication Data

US 2012/0177454 A1    Jul. 12, 2012

(30) Foreign Application Priority Data

Jan. 6, 2011   (GB) .................................. 1100119.5

(51) Int. Cl.
*B23Q 11/02* (2006.01)
*B23Q 11/00* (2006.01)
*F04B 53/04* (2006.01)
*F04B 53/08* (2006.01)

(52) U.S. Cl.
CPC ............ *B23Q 11/0046* (2013.01); *F04B 53/04* (2013.01); *F04B 53/08* (2013.01); *Y10T 408/44* (2015.01); *Y10T 408/96* (2015.01)

(58) Field of Classification Search
CPC  B23B 2270/62; B23B 47/34; B23Q 11/0046; B23Q 11/006; B23Q 11/0071
USPC ............................ 408/67, 72 B, 115 R, 115 B
See application file for complete search history.

(56) References Cited

U.S. PATENT DOCUMENTS

| | | | |
|---|---|---|---|
| 4,184,226 A * | 1/1980 | Loevenich | .................... 15/415.1 |
| 4,205,728 A | 6/1980 | Gloor | |
| 5,234,294 A * | 8/1993 | Hoppe et al. | ..................... 408/67 |
| 8,052,357 B2 * | 11/2011 | Bruntner | .......................... 408/67 |
| 2009/0172911 A1* | 7/2009 | Miyanaga | ........................ 15/339 |
| 2009/0181606 A1* | 7/2009 | Loveless et al. | .............. 451/456 |

FOREIGN PATENT DOCUMENTS

| | | |
|---|---|---|
| AU | 200059513 A * | 3/2001 |
| DE | 202006009078 | 10/2007 |
| DE | 202008008561 | 9/2008 |
| EP | 0938947 | 9/1999 |
| EP | 1447194 | 8/2004 |
| EP | 2335868 | 6/2011 |
| FR | 2339460 | 8/1977 |
| GB | 2067106 A * | 7/1981 |
| GB | 2262159 A * | 6/1993 |
| GB | 2335032 | 9/1999 |

* cited by examiner

*Primary Examiner* — Sunil K Singh
*Assistant Examiner* — Alan Snyder
(74) *Attorney, Agent, or Firm* — Adan Ayala

(57) ABSTRACT

A suction cup dust extractor for a drill including a housing; a drill collar attached to the housing, having a drill passage formed through it; a recess formed by the walls of the housing having an opening and which, in use, locates against a work piece to create a chamber; an aperture located on the housing through which air can pass; and an air passage formed within the housing which enables air to pass from the drill passage to the aperture.

14 Claims, 11 Drawing Sheets

DUST EXTRACTOR

BACKGROUND OF THE INVENTION

The present invention relates to a dust extractor for use with a drill, hammer drill or hammer, and in particular to a suction cup dust extractor.

U.S. Pat. No. 4,205,728 and DE202008008561 both disclose a suction cup dust extractor for a drill.

SUMMARY OF THE INVENTION

Accordingly, there is provided a suction cup dust extractor for a drill comprising:

a housing;

a drill collar attached to the housing, having a drill passage formed through it;

a recess formed by the walls of the housing having an opening and which, in use, locates against a work piece to create a chamber;

an aperture located on the housing through which air can pass;

at least one first air passage formed within the housing which enables air to pass from the drill passage to the aperture; and at least one second air passage formed within the housing which enables air to pass from the recess to the aperture;

wherein the collar comprises:

an inner wall which at least partially surrounds the drill passage;

an outer wall which at least partially surrounds the inner wall;

the inner wall and outer wall forming a wall passage in between them which connects to the at least one first air passage to allow air to pass from the wall passage to the at least one first air passage;

the depth of at least part of the inner wall being less than that of the outer wall to allow air to flow around the base of the inner wall from the drill passage to the wall passage; characterized in that there is provided a cover which attaches to the outer wall to enclose the lower side of the wall passage.

BRIEF DESCRIPTION OF THE DRAWINGS

Two embodiments of the invention will now be described with reference to enclosed drawings of which.

DETAILED DESCRIPTION OF THE DRAWINGS

Figure 1:
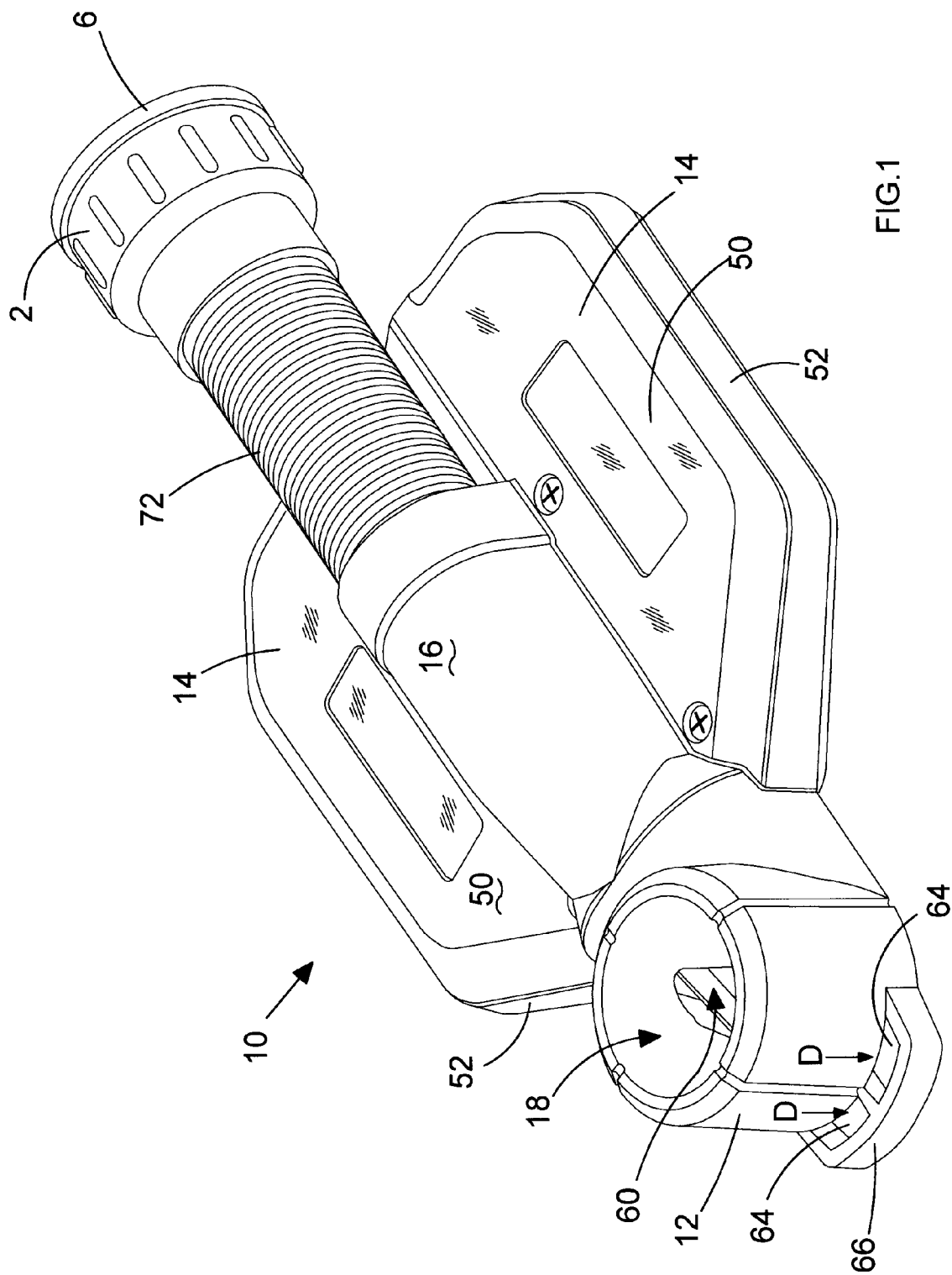
FIG. 1 shows a perspective view of the top of an example of a suction cup dust extractor.
Figure 2:
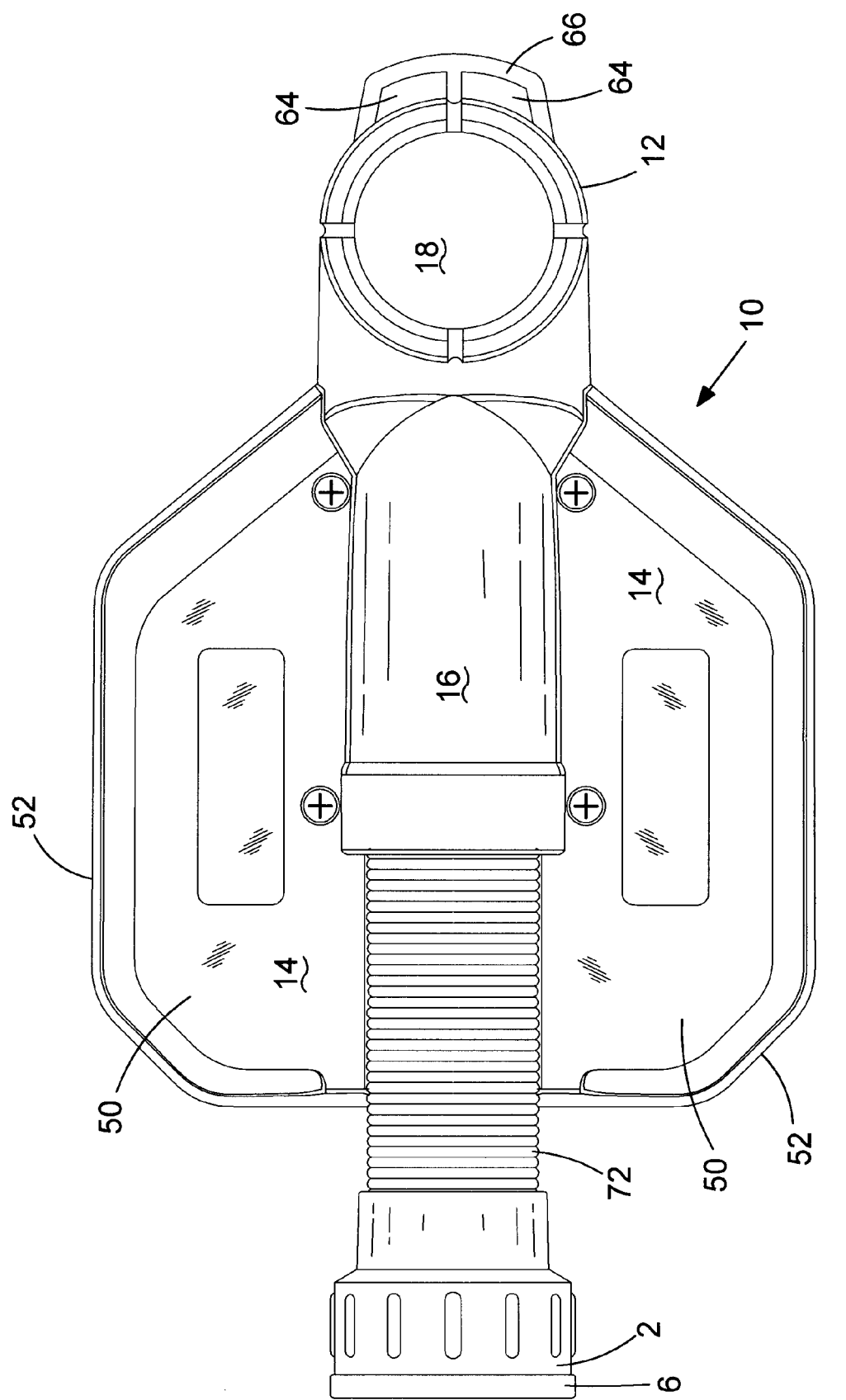
FIG. 2 shows a top view of the example of suction cup dust extractor.
Figure 3:
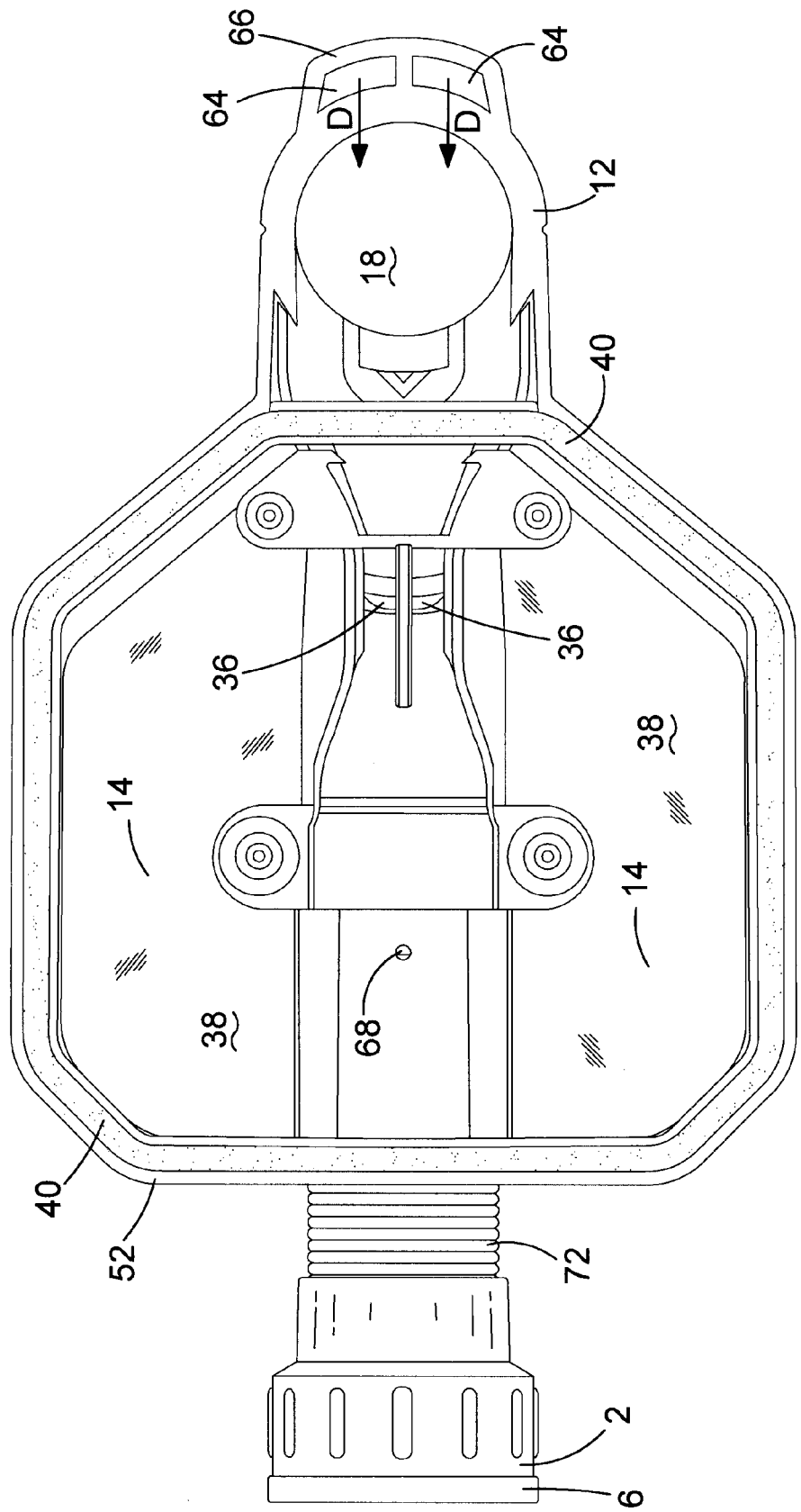
FIG. 3 shows a bottom view of the example of suction cup dust extractor.
Figure 4:
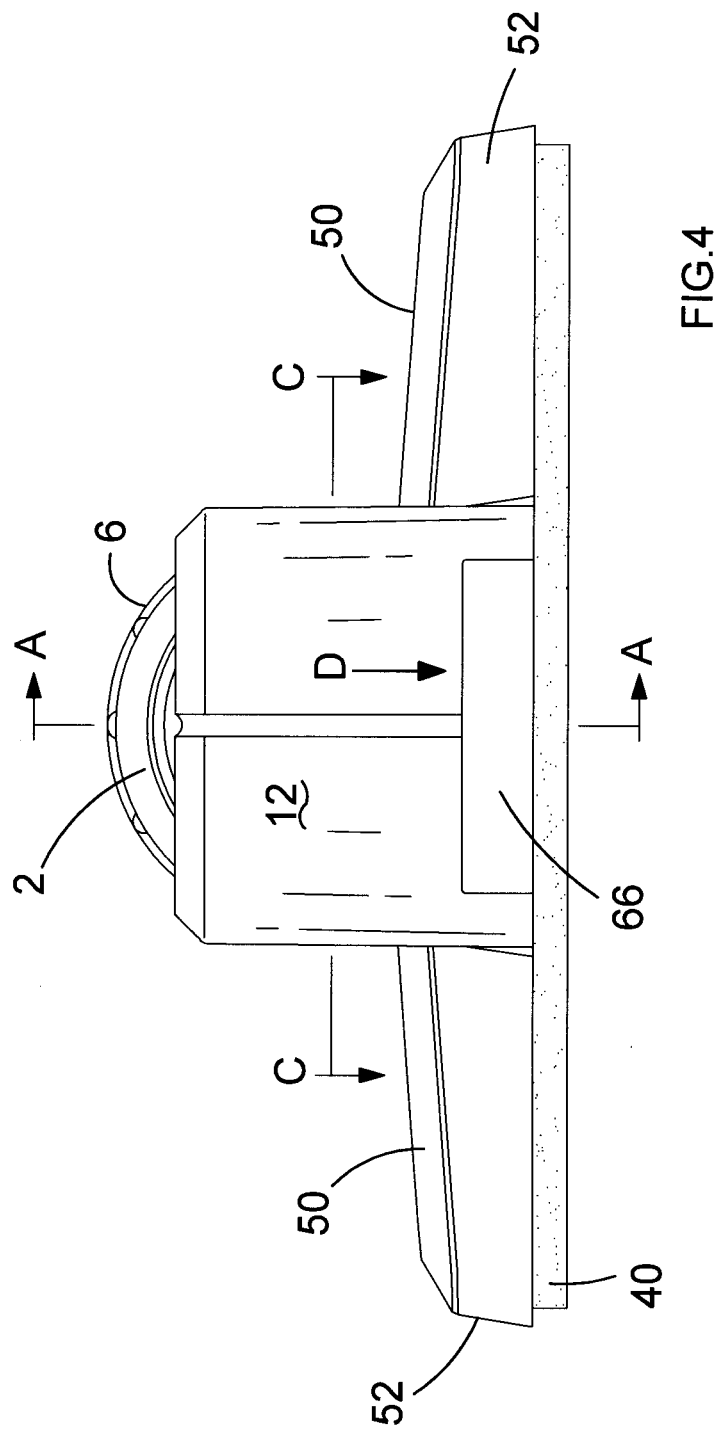
FIG. 4 shows a front view of the example of suction cup dust extractor.

An example of a suction cup dust extractor will now be described with reference to the enclosed drawings.

The suction cup dust extractor comprises a housing 10 and a drill collar 12 rigidly connected to it at the top end of the housing 10. The housing 10 comprises a skirt 14 with a bridge 16 formed on top of the skirt 14. The bridge 16 extends from the middle of the skirt 16 to the top end of the skirt 16 where it is attached to the side of the drill collar 12. The skirt 14 has a top wall 50 and side walls 52 which form a large recess 38, on the opposite side of the skirt 14 to that on which the bridge 16 is attached, which has an opening which faces away from the bridge 16.

Figure 5:
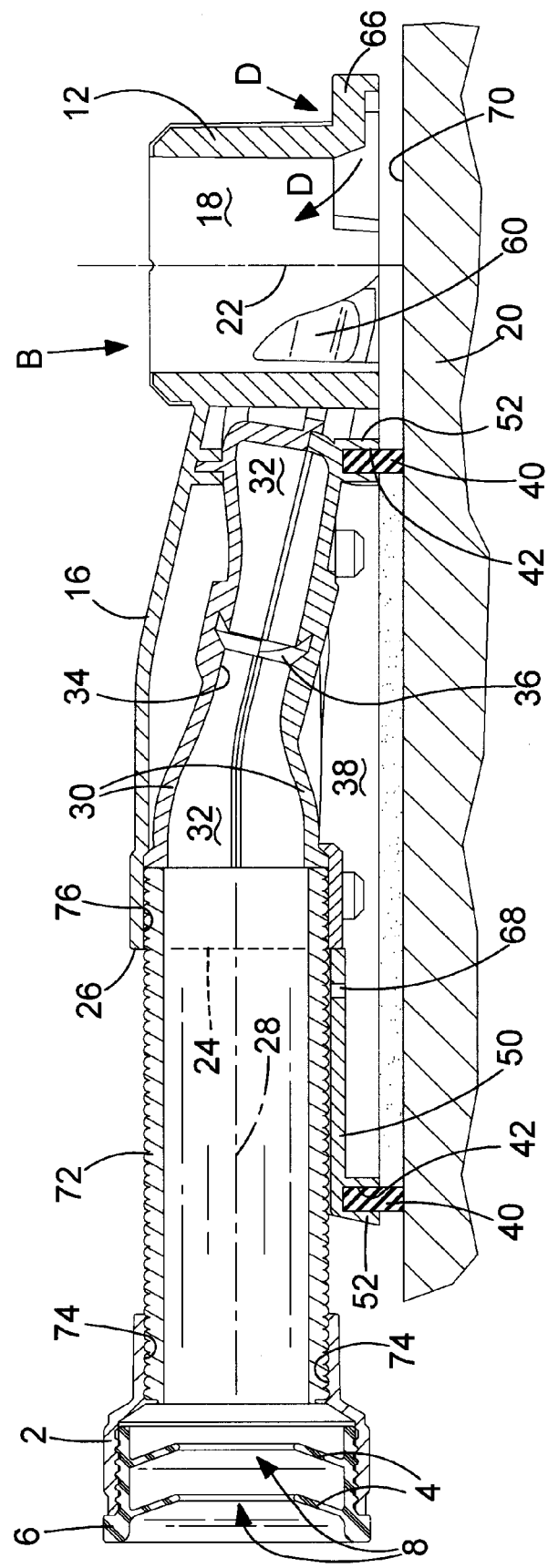
FIG. 5 shows a vertical cross sectional view of the suction cup dust extractor in the direction of Arrows A in FIG. 4.
Figure 6:
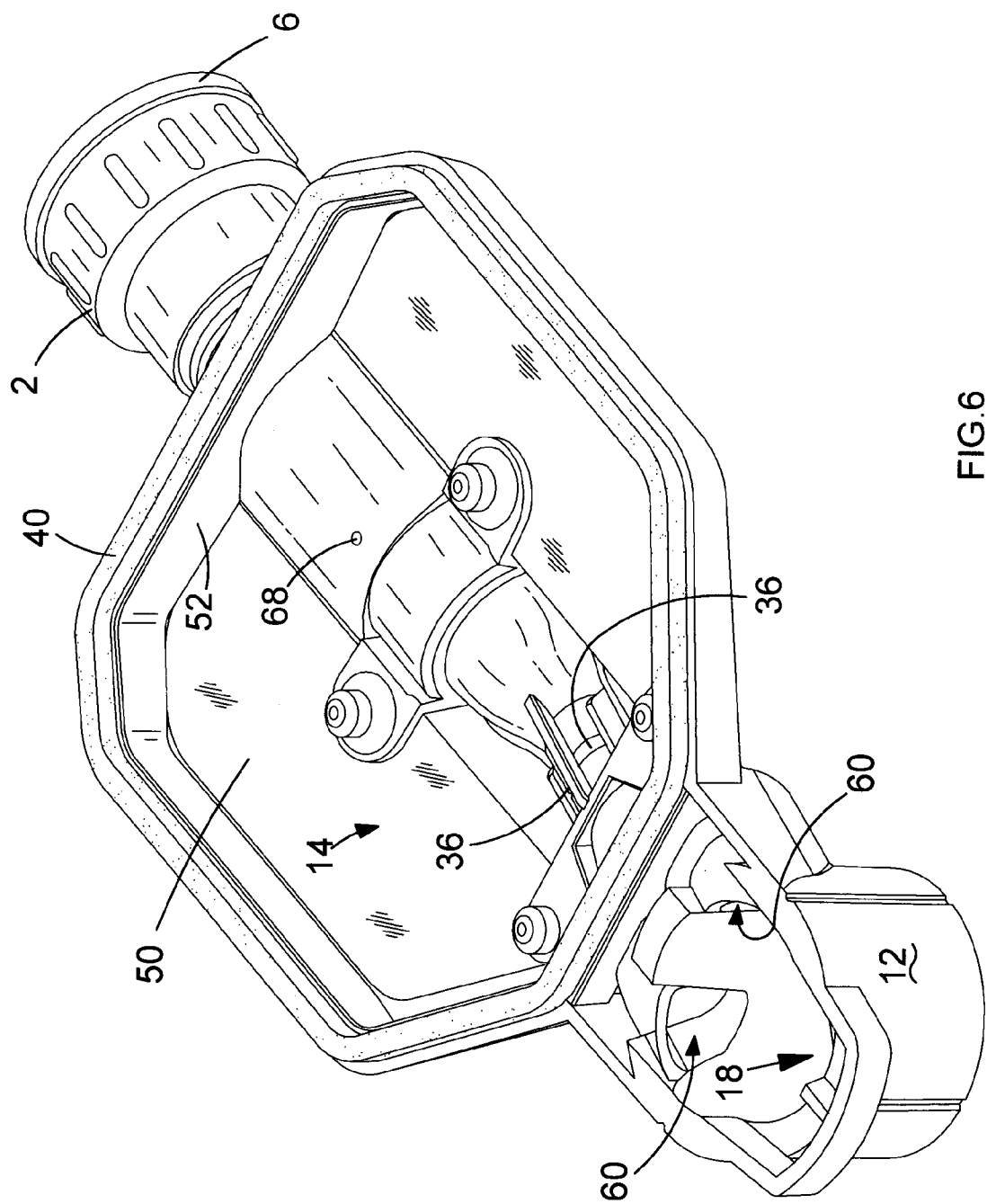
FIG. 6 shows a perspective view of the underside of the example of suction cup dust extractor.
Figure 7:
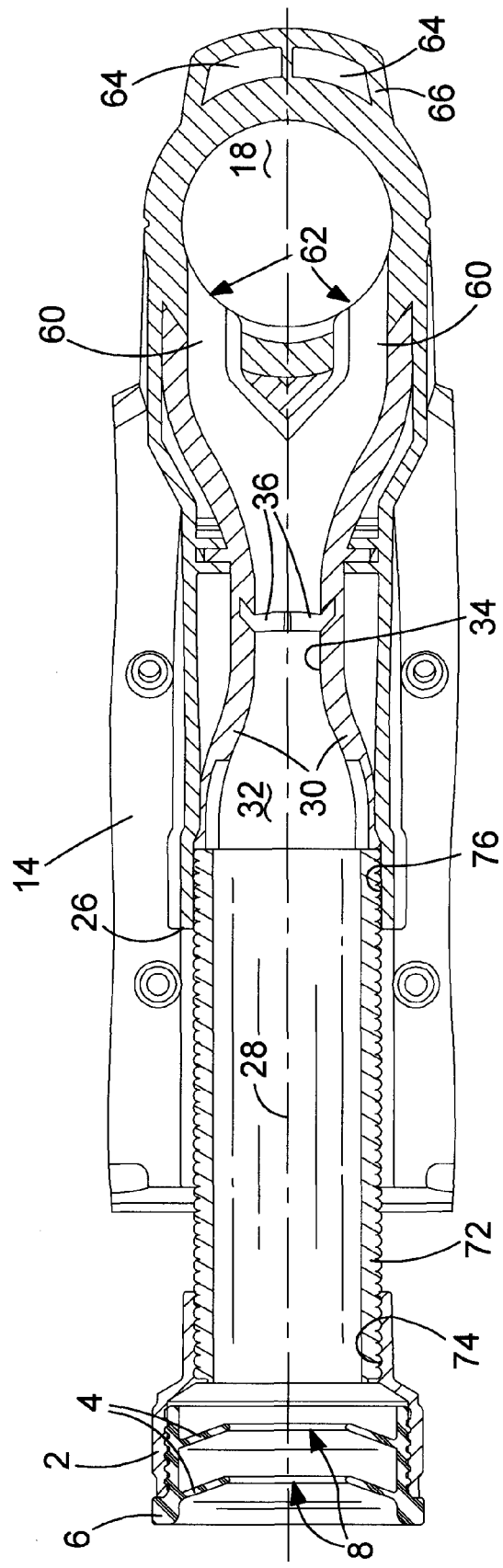
FIG. 7 shows a horizontal cross sectional view of the suction cup dust extractor in the direction of Arrows C in FIG. 4.

The drill collar 12 forms a drill passage 18 which enables a cutting tool, such as a drill bit (not shown), to pass through it (direction of Arrow B in FIG. 5) to engage a work piece 20. The drill collar 12 has a longitudinal axis 22. Both the drill passage 18 and the opening of the recess 38 are orientated in the same direction.

Formed in end 26 of the bridge 16 in the middle of the skirt 14 is an aperture 24 which provides an air exit. The aperture 24 has a longitudinal axis 28 which is perpendicular to and intersects with the longitudinal axis 22 of the drill collar 12.

Formed by internal walls 30 of the housing 10 is a first passage 32 which extends from the aperture 24 towards the drill passage 18 of the drill collar 12. Formed within the first passage 32 is a throat 34 where the diameter of the passage 32 is reduced. Two apertures 36 are formed through the wall of the passage 32 at the narrowest point of the throat 34. The apertures 36 provide a passageway from the passage 32 to the recess 38 formed by the skirt 14.

The passage 32 splits into two passages 60 between the throat 34 and the drill passage 18, each connecting with the drill passage 18 through a separate aperture 62.

An inlet air passage 64 is formed in by a frame 66 attached to the base of the drill collar 12 and operates in the same manner as that described in EP1457288. Air can pass through the inlet air passage into the drill collar 12 as shown by Arrow D.

A seal 40 locates in a groove 42 formed around the periphery of the wall of the skirt 20 on the underside of the skirt 14. When the suction cup dust extractor is placed against a work piece 20, it engages with the seal 40, the work piece 20 sealing the opening to the recess 38 to form a chamber.

An air hole 68 is provided in the wall 50 of the skirt 20 to provide a small air passage between the recess and the surrounding atmosphere. During the use of the suction cup dust extractor, the hole 68 ensures that there is a limited but constant air flow in the recess formed under the skirt 20 if the seal provides a perfect air seal with the work piece 20.

The suction cup extractor further comprises a tubular connection collar 2 which connects to a vacuum source (not shown). A rubber seal 4 is fastened inside of the connection collar 2 and which comprises two rubber rings 4 which extend radially inwards from the drill collar 12 with an aperture 8 formed through them. The rings 4 are capable of gripping onto the nozzle (not shown) of a hose (not shown) of the vacuum source. As the rings 4 are resilient, they can stretch radially outwardly, increasing the size of the apertures 8, enabling nozzles of different sizes to be used. The rings 4 would then grip the nozzle due to their resilience and frictionally hold the nozzle.

The connection collar 2 connects to the aperture 24 via a flexible tube 72. One end of the flexible tube 72 is held in a sleeve 74 formed in the connection collar 2, the other in a sleeve 76 formed in the bridge 16. The flexible tube 72 can be stretched to extend its length and move the collar 2 away from the housing 10 or be bent or twisted to allow the connection collar 2 to be moved to a range of positions relative to the aperture 24. The flexible tube 72 is made from rubber.

In use, the suction cup dust extractor is placed against a surface 70 of the work piece 20 so that the seal 40 makes contact with it. A chamber is formed when opening of the recess 38, formed by the walls 50, 52, of the skirt 14 is sealed by the surface 70 of the work piece 20. The suction device is activated and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the two apertures 36 due to a venturi effect. This results in the air in the recess 38 to be sucked out through the apertures 36 and into the passage 32. This causes the skirt 14 and hence the dust extractor, to be attached to the surface 70 due to the suction. The hole 68 ensures that there is a constant flow of air from the hole 68, through the recess 38, and then through the two apertures 36. The operator can then drill a hole in the surface by passing the drill bit through the drill collar 12 and drilling into the surface 70. Any debris generated during the drilling process will be sucked up into the drill passage 18 and then into passages 60. The use of two passages provides better debris clearance. The debris is then transported through the passage 32, through the aperture 24, through the flexible tube 72 and then through the connection collar 2. The hole 68 ensures that there is always air passing through the two apertures into the passage 32, thus ensuring no debris passes into the apertures 36 or the recess 38.

Figure 8:
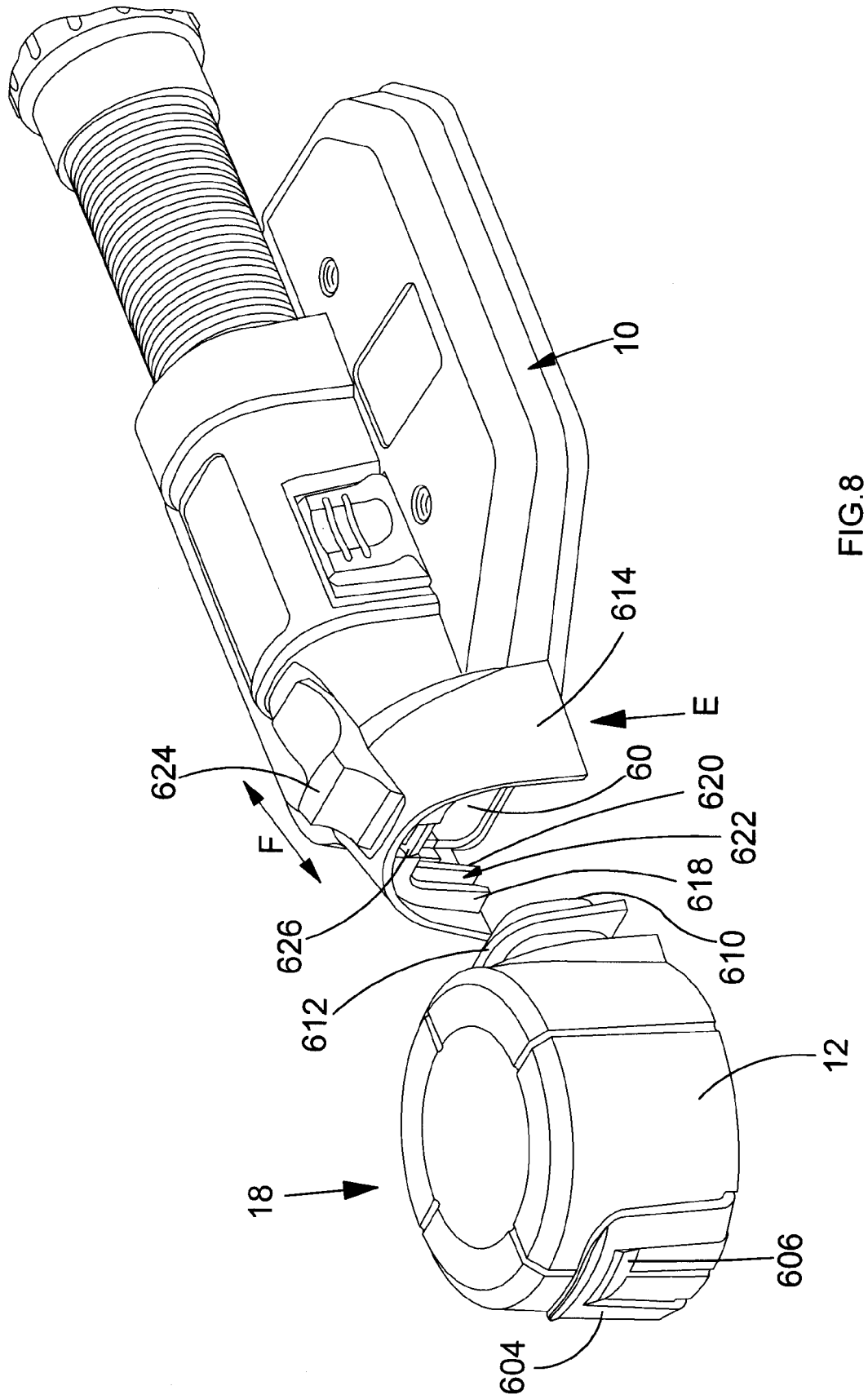
FIG. 8 shows a perspective view of a first embodiment of the present invention with the collar detached.
Figure 9:
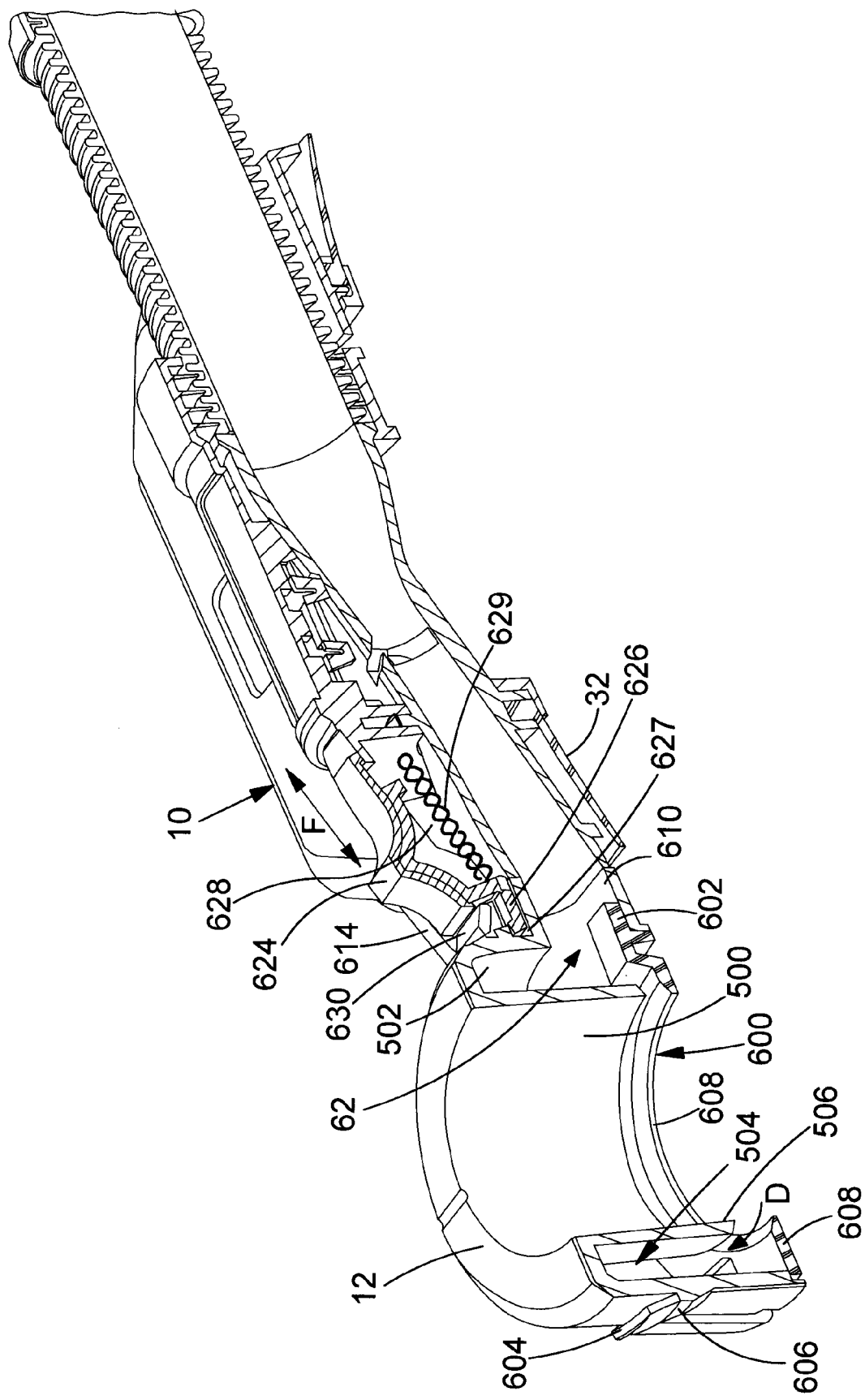
FIG. 9 shows a perspective view of a vertical cross section, with the collar attached.
Figure 10:
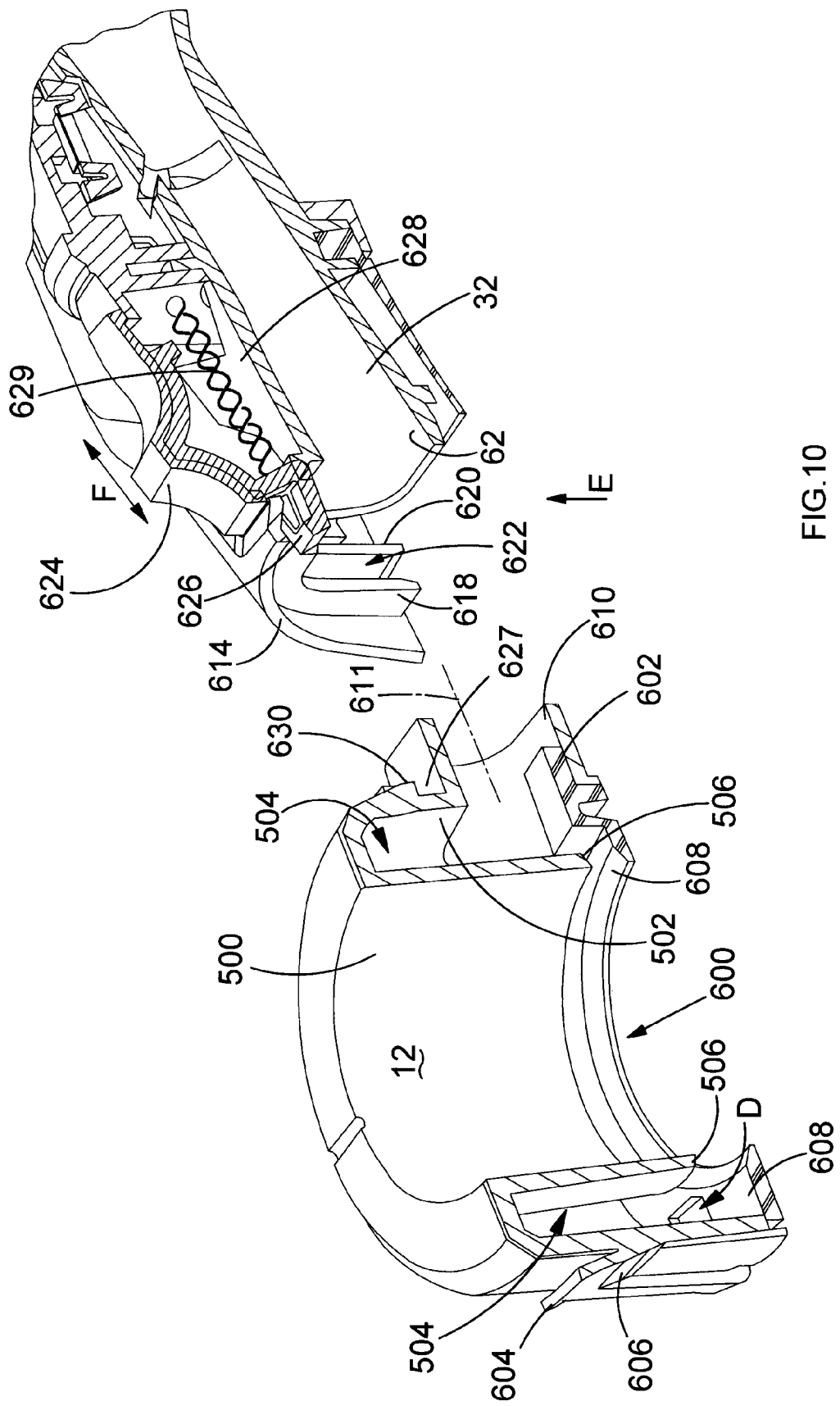
FIG. 10 shows a perspective view of a vertical cross section, with the collar detached.

A first embodiment of the present invention will be described with reference to FIGS. 8 to 10. Where the same features are present in the first embodiment that were present in the first example, the same reference numbers have been used. The design of the first embodiment is the same as for the first example except for the design of the collar and the fact that it is detachable.

The collar 12 comprises a circular inner wall 500 and a circular outer wall 502 with a circular passage 504 formed in between. The circular passage connects to the first passage 32 via an exit tube 610 formed on the collar 12. (The first passage no longer splits into two separate passages 60 as described in the first example above). The depth of the inner wall 500 is less than that of the outer wall 502 so that air flow around (Arrow D) the base 506 of the inner wall 500 from the drill passage 18 into the circular passage 504, prior to being drawn into the first passage 32. The depth of both the inner wall and the outer wall are both uniform, the difference between their depths being constant along the length of the inner and outer walls.

In addition, there is provided a cover 600 which clips onto the under side of the collar 12. The cover 600 comprises a lip 602 on one side which is capable of being inserted into the exit tube 610. On the other side there is a catch 604. To attach the cover, the lip 602 is inserted into the exit tube 610 (as best seen in FIG. 10) and then the catch 604, which is resiliently deformable, engages with a ridge 606 formed on the outer wall of the collar 12. The cover provides a barrier 608 which faces towards and partly encloses the circular passage 504. This assists in guiding the air flow in the drill collar 12 by preventing air from below the drill collar from entering the circular passage 504 and ensuring only air and entrained debris inside the drill passage 18 enters the circular passage 504.

The collar 12 is releasably detachable. This enables collars of differing diameters to be used. They will have the same design but with different dimensions. The collar 12 is releasably detachable using a locking mechanism which will now be described.

Formed on the collar 12 is the exit tube 610. Two ridges 612 are formed on either side of the exit tube 610. A skirt 614, of corresponding dimensions to the exit tube 610, is formed on the housing 10 of the dust extractor. Two sets of ridges 618, 620 are formed on each side of the under side of the skirt 614 which result in a groove 622 being formed on each side between them. The ridges 612 can be slid into the grooves 622 (Arrow E) so that the exit tube 610 engages with the underside of the skirt 614. This results in the collar 12 being attached to the skirt 614.

A latch mechanism holds the ridges 612 in the grooves 622. The latch mechanism comprises a slideable button 624 which can slide in the direction of Arrow F. The button comprises a projection 626. A helical spring 629 locates in the cavity 628 below the button 624 and biases the button towards the collar 12. A recess 627 is formed by protrusion 630 on the side of the collar 12. When the collar is attached to the skirt 614, the projection 626 engages the recess 627 and prevents the removal of the collar 12. In order to detach the collar, the button 624 is slid away from the collar 12, against the biasing force of the spring, disengaging the projection 626 from the recess 627. The ridges 612 can then be slid out of the grooves 622.

Figure 11:
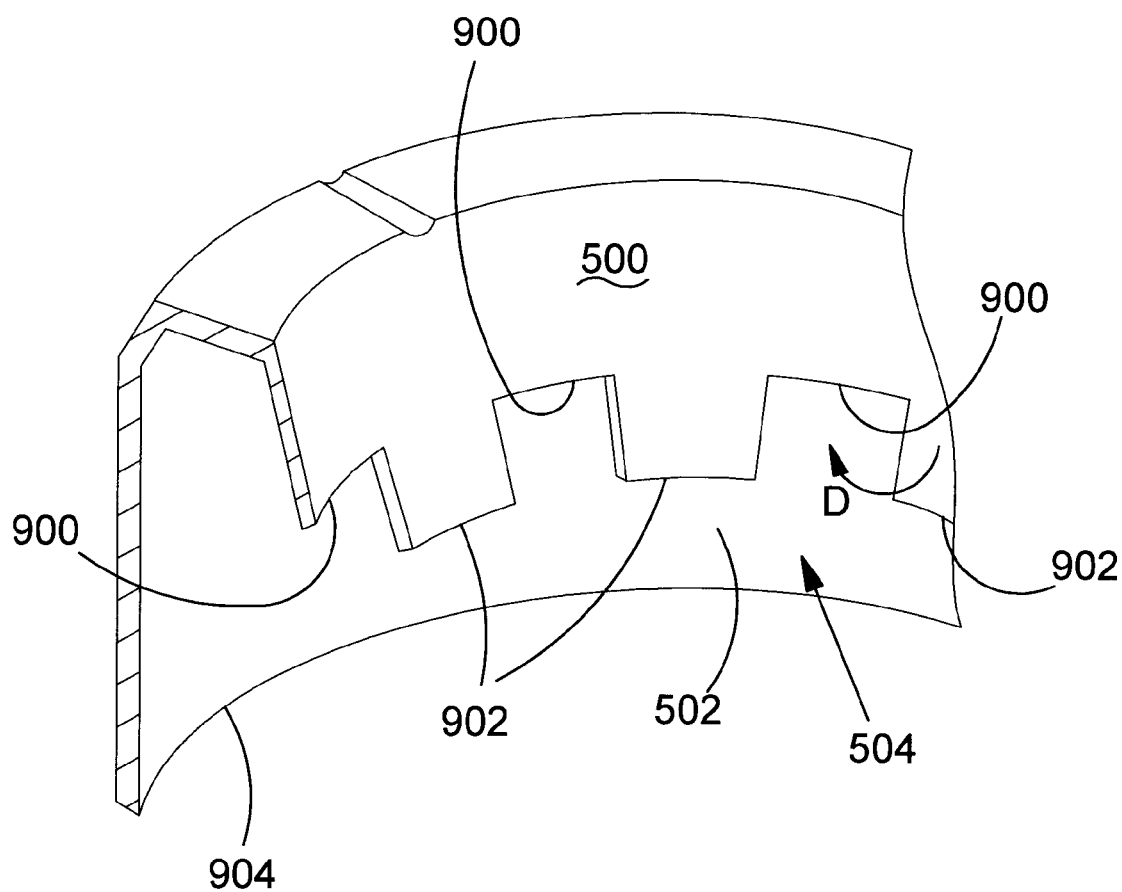
FIG. 11 shows a segment of the collar according to a second embodiment of the present invention.

A second embodiment of the present invention will be described with reference to FIG. 11. Where the same features are present in the second embodiment that were present in the first embodiment, the same reference numbers have been used. The design of the second embodiment is the same as for the first embodiment except for the design of the inner wall 500.

The lower edge 900, 902 of the inner wall is castellated. The lower edges 902 may extend downwardly as far as the lower edge 904 of the outer wall 502 or may be higher as shown. The use of castellations can provide control of the air flow around lower edge of the inner wall. It will be appreciated that other designs can be used for the lower edge to improve air flow.

Although exemplary embodiments of the present invention have been shown and described, it will be appreciated by those skilled in the art that changes may be made to these embodiments without departing from the principles and spirit of the invention, the scope of which is defined in the appended claims and their equivalents

The invention claimed is:

1. A suction cup dust extractor for a drill comprising:
a housing;
a drill collar extending from and removably attached to the housing, having a drill passage formed therethrough open to a work piece, which, in use, entrains debris generated when a cutting tool is selectively positioned through the drill collar and used to cut into the work piece;
a recess formed by the walls of the housing having an opening and which, in use, locates against the work piece to create a chamber spaced from the drill passage along the work piece, the chamber configured to hold the suction cup dust extractor to the work piece during the selective positioning of the cutting tool through the drill collar;

an aperture located on the housing through which air can pass;

at least one first air passage formed within the housing which enables air to pass from the drill passage to the aperture; and at least one second air passage formed within the housing which enables air to pass from the recess to the aperture, the at least one second air passage being at least partially spaced from and partitioned from the at least one first air passage by a portion of the suction cup dust extractor;

wherein the collar comprises:

an inner wall which at least partially surrounds the drill passage;

an outer wall which at least partially surrounds the inner wall;

the inner wall and outer wall forming a wall passage in between them which connects to the at least one first air passage to allow air to pass from the wall passage to the at least one first air passage;

the depth of at least part of the inner wall being less than that of the outer wall to allow air to flow around the base of the inner wall from the drill passage to the wall passage;

wherein there is provided a cover which attaches to the outer wall and extends inward towards the inner wall to substantially enclose a lower side of the wall passage.

2. A suction cup dust extractor as claimed in claim 1 wherein the inner wall and outer wall are circular.

3. A suction cup dust extractor as claimed in claim 1 wherein the depth of the outer wall is uniform.

4. A suction cup dust extractor as claimed in claim 1 wherein the depth of the inner wall is uniform.

5. A suction cup dust extractor as claimed in claim 1 wherein the depth of the inner wall varies.

6. A suction cup dust extractor as claimed in claim 5 wherein the base of the inner wall is castellated.

7. A suction cup dust extractor as claimed in claim 6 wherein the depth of the lowest part of the castellations is the same as that of the outer wall.

8. A drill collar for a suction cup dust extractor having a drill passage formed through it comprising:

an inner wall which at least partially surrounds the drill passage;

an outer wall which at least partially surrounds the inner wall;

the inner wall and outer wall forming a wall passage in between them;

the depth of at least part of the inner wall being less than that of the outer wall to allow air to flow around the base of the inner wall from the drill passage to the wall passage;

an exit tube configured to provide a passage which is in fluid connection with the wall passage; and a cover which attaches to the outer wall and extends inward towards the inner wall to substantially enclose a lower side of the wall passage;

wherein the cover comprises a lip on one side which is capable of being inserted into the exit tube and a catch located on the other side of the cover which engages a ridge formed on the outer wall of the collar.

9. A drill collar as claimed in claim 8 wherein the inner wall and outer wall are circular.

10. A drill collar as claimed in claim 8 wherein the depth of the outer wall is uniform.

11. A drill collar as claimed in claim 8 wherein the depth of the inner wall is uniform.

12. A drill collar as claimed in claim 8 wherein the depth of the inner wall varies.

13. A drill collar as claimed in claim 12 wherein the base of the inner wall is castellated.

14. A drill collar as claimed in claim 13 wherein the depth of the lowest part of the castellations is the same as that of the outer wall.

* * * * *